United States Patent [19]

Teets et al.

[11] Patent Number: 4,966,299
[45] Date of Patent: Oct. 30, 1990

[54] FUEL ASSEMBLY HAVING A VAPOR VENT WITH A HINGED FLOAT VALVE

[75] Inventors: Michael R. Teets, Grosse Pointe Park; Keith A. Kerby, Clarkston; Michael P. Rafferty, Warren; Wayne D. Carver, Pontiac; Robert Shrodes, Jr., Mt. Clemens, all of Mich.

[73] Assignee: Chrysler Corporation, Highland Park, Mich.

[21] Appl. No.: 378,567

[22] Filed: Jul. 11, 1989

[51] Int. Cl.⁵ .............................................. B01D 53/02
[52] U.S. Cl. ......................... 220/85 VR; 220/85 VS; 220/85 F; 137/587; 137/588; 141/303; 141/46; 141/307; 123/516
[58] Field of Search ........... 220/85 VS, 85 VR, 85 V, 220/85 F; 137/587, 588, 589; 141/44, 45, 46, 59, 301, 303, 307; 123/516, 518, 519

[56] References Cited

U.S. PATENT DOCUMENTS

| | | | |
|---|---|---|---|
| 2,544,651 | 3/1951 | Boardman | 137/587 |
| 4,157,104 | 6/1979 | Lofquist | 220/85 VR |
| 4,232,715 | 11/1980 | Pyle . | |
| 4,271,976 | 6/1981 | Detwiler | 220/DIG. 33 |
| 4,385,615 | 5/1983 | Keane | 123/516 |
| 4,592,205 | 6/1986 | Brodbeck et al. | 137/587 |
| 4,630,749 | 12/1986 | Armstrong et al. . | |
| 4,651,889 | 3/1987 | Koji et al. . | |
| 4,706,708 | 11/1987 | Fornuto et al. . | |
| 4,714,172 | 12/1987 | Morris | 220/85 VS |
| 4,715,509 | 12/1987 | Ito et al. . | |
| 4,724,861 | 2/1988 | Covert et al. . | |
| 4,742,809 | 5/1988 | Ito et al. . | |
| 4,747,508 | 5/1988 | Sherwood | 220/85 VS |
| 4,762,247 | 8/1988 | Temmesfield | 220/DIG. 33 |
| 4,765,504 | 8/1988 | Sherwood et al. | 220/85 VS |
| 4,798,306 | 1/1989 | Giacomazzi et al. | 220/85 VR |
| 4,809,863 | 3/1989 | Woodcock et al. | 220/85 VR |
| 4,812,908 | 4/1989 | Yost | 220/85 VR |
| 4,813,453 | 3/1989 | Jenkins et al. | 220/85 VR |
| 4,816,045 | 3/1989 | Szlaga et al. | 220/85 VS |

Primary Examiner—Stephen Marcus
Assistant Examiner—S. Castellano
Attorney, Agent, or Firm—Kenneth H. MacLean, Jr.

[57] ABSTRACT

In association with a fuel tank of a vehicle with an inlet, an improved fuel filler assembly therein with first and second sealing means for isolating the interior of the fuel tank from the atmosphere and a vapor storage canister before a refill of the tank and subsequently from the atmosphere but not the storage canister during a refill operation while preventing passage of liquid to the storage canister.

2 Claims, 2 Drawing Sheets

FUEL ASSEMBLY HAVING A VAPOR VENT WITH A HINGED FLOAT VALVE

BACKGROUND OF THE INVENTION

1. Field of Invention

The present invention relates to an improved fuel filler assembly for the inlet of a vehicle fuel tank.

2. Description of the Related Art

When a vehicle's fuel tank is filled with liquid fuel at the gas station by means of the typical fuel pump nozzle, fuel vapor above the liquid fuel in the fuel tank interior is displaced out of the fuel tank as the liquid level increases. It is undesirable to vent this fuel vapor to the atmosphere and earlier proposals have vented this vapor to a vapor storage canister provided for this purpose.

One example of a prior arrangement which isolates fuel tank vapor from atmosphere is disclosed in U.S. Pat. No. 4,651,889.

Other examples of prior arrangements of this type are disclosed in U.S. Pat. Nos. 4,742,809, 4,706,708; 4,724,861; 4,630,749; 4,715,509 and 4,232,715.

SUMMARY OF THE INVENTION

The subject invention provides an improved fuel filler assembly for a fuel tank inlet to isolate or seal the fuel tank interior from atmosphere during normal vehicle use and when the tank's cap is removed. This assembly even seals the tank from atmosphere during a normal fuel filling operation in which a nozzle of a fuel pump is inserted into the inlet of the fuel tank and into the filler assembly. Before the nozzle is inserted into the inlet, a closure door and associated seal isolate the tank interior from atmosphere and from a refill vapor storage canister. The canister is provided to trap and store fuel vapor displaced from the fuel tank during a liquid fuel refilling operation. As the gas pump nozzle is moved into the filler inlet assembly, it first engages a ring shaped seal of resilient material. Engagement between the seal and the nozzle prevents liquid or vaporous fuel flow therebetween. Further movement or insertion of the nozzle into the inlet assembly results in the nozzle end engaging and pivoting the closure door away from its associated seal toward an opened position. In the open position, liquid fuel can be introduced into the tank. Simultaneously, the displaced fuel vapors are allowed to flow between the outer surface of the nozzle and the door seal to the refill vapor storage canister.

The details as well as other features and advantages of preferred embodiments of this invention are set forth in the remainder of the specification and are shown in the drawings.

IN THE DRAWINGS

FIG. 1 is a sectioned view of the elongated inlet tube of a vehicle fuel tank with the subject fuel filler assembly therein and fuel delivery nozzle in place for a filling operation; and FIG. 1a is a fragmentary sectioned view taken along section line 1a—1a in FIG. 1 and looking in the direction of the arrows; and FIG. 2 is a fragmentary sectioned view of a portion of the filler assembly shown in FIG. 1 with the fuel delivery nozzle removed; and FIG. 3 is an end sectioned view taken along section line 3—3 in FIG. 2 and looking in the direction of the arrows; and FIG. 4 is a fragmentary sectioned view similar to FIG. 1 but showing a modification thereto.

DETAILED DESCRIPTION OF EMBODIMENTS

Figure 1:
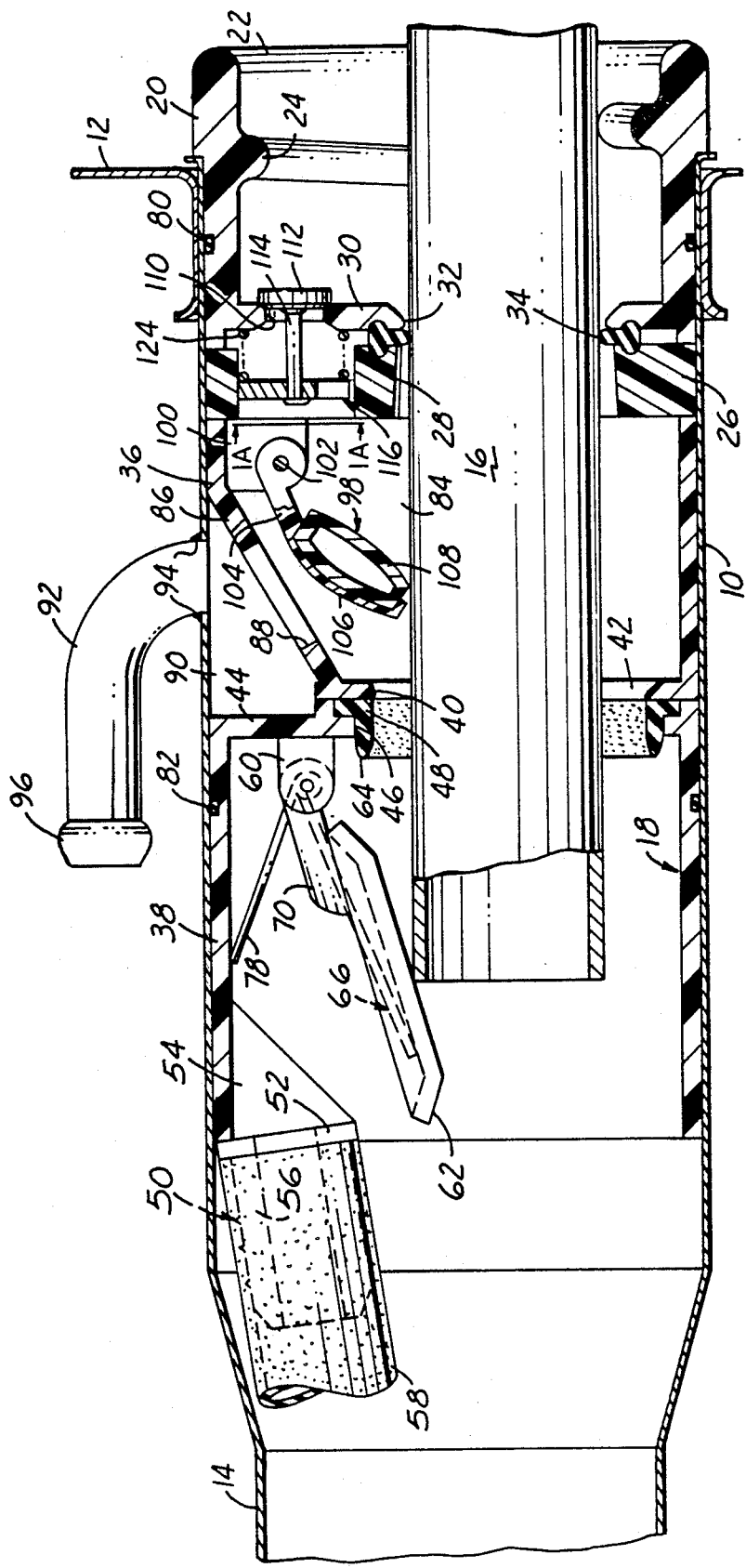

In FIG. 1, the outer end portion of a tubular inlet 10 of an associated fuel tank (not shown) is illustrated in cross section. The extreme end portion of the inlet 10 is attached to a surrounding flange member 12 which is adapted to connect to a portion of the vehicle structure (not shown). The left end 14 of the inlet tube 10 is adapted to extend towards an associated fuel tank. As illustrated in FIG. 1, a tubular fuel delivery nozzle 16 is positioned centrally in the filler tube as during a fill operation of the tank interior.

A first embodiment of the improved filler inlet assembly 18 is shown in FIG. 1. The assembly has a generally tubular housing means which has a configuration conforming to the interior of the tank's inlet tube 10 so that it can be insertably mounted within the inlet tube 10. Preferably, the housing means is formed by several members which are located end to end in the inlet tube. The outermost or rightward housing 20 defines a relatively large open ended interior space 22 adapted to receive a closure cap (not shown) as is common in the fuel tank art. The housing 20 has interior thread-like ridges 24 in a spiral pattern which are adapted to engage the closure cap.

Located inwardly from the first housing 20 is a second housing 26 which has a aperture 28 therethrough. Aperture 28 has a sufficient diameter so that the nozzle 16 easily extends therethrough leaving an annular space therebetween. A radially directed wall portion 30 of first housing 20 extends adjacent the rightward end of the second housing 26 and has an aperture 32 therein to allow nozzle 16 to pass easily therethrough. A ring seal 34 with an annular shape is supported between housing member 26 and wall member 30. The inner edge of the ring seal 34 slidingly engages the outer surface of nozzle 16 in a sealing relation. This sealing engagement prevents outward flow of fluid from the interior of the fuel tank.

Two additional housings 36 and 38 are positioned axially inwardly from housing members 26. Housing 36 is next to housing 26 and has an aperture 40 therein to allow nozzle 16 to easily pass therethrough. The diameter of the aperture 40 is sufficiently greater than the nozzle's diameter so that an annular passage 42 is formed about the nozzle 16 which is useful during the tank filling operation. The other housing 38 is positioned inwardly from housing 36 and has a radially directed wall 44 which defines an opening 46 for passage of nozzle 16. A second seal member 48 is supported in a channel formed between a portion of the wall 44 located slightly outwardly from opening 46 and a portion of housing 36 slightly outwardly from the aperture 40. The seal member 48 encircles nozzle 16 as shown in FIG. 1 but has a sufficiently large diameter relative to the nozzle 16 to allow fluid to flow from the tank interior to annular passage 42.

A vent hose fitting or portion 50 projects from the housing 38 and includes an end wall portion 52, a reinforcing wall portion 54 and passage forming portion 56. The portion 56 extends into the end of a resilient vent hose 58. The remainder of the vent hose 58 extends through the leftward portion 14 of the inlet tube to the interior of the associated fuel tank. The purpose of vent hose 58 is to pass air and fuel vapor from the upper portion of the fuel tank interior to the inlet assembly during fuel filling.

Figure 2:
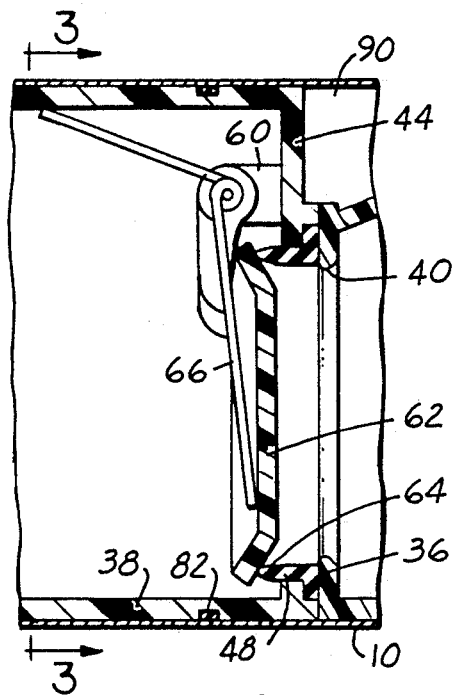

Housing 38 has bracket means 60 extending from the wall portion 44. The bracket means 60 supports a closure door 62 which is pivotal between opened and closed positions relative to seal 48 as illustrated in FIGS. 1 and 2. In FIG. 1, the door is shown in its opened position away from the edge 64 of seal 48. In FIG. 2, the door 62 is shown in its normally closed position assumed when the nozzle 16 is withdrawn. In this closed position, door 62 sealingly engages a seal edge 64.

Figure 3:
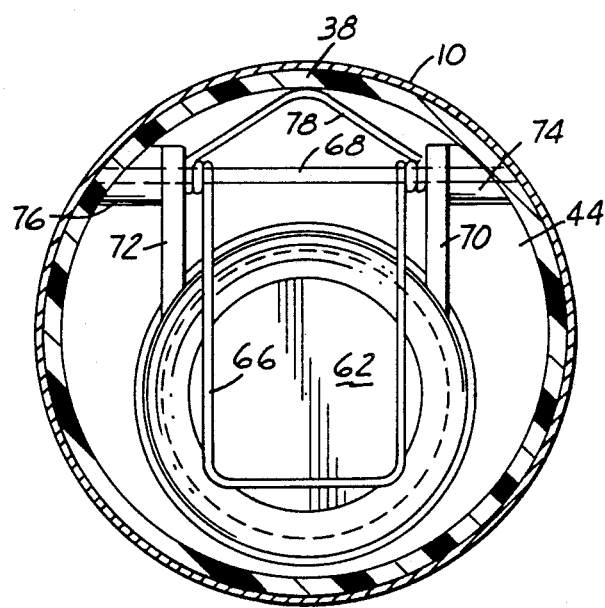

A wire type spring 66 urges the door 62 toward the closed position shown in FIG. 2. As best shown in FIG. 3, the midportion of spring 66 is mounted with coil portions thereof about a shaft or hinge pin 68 which also supports door 62 for pivotal movements. Door 62 includes a pair of brackets 70 and 72. The shaft 68 extends through the ends of the brackets 70 and 72 as well as through the coil portions of spring 66. The ends of the pin 68 are supported by shoulder portions 74 and 76 which are part of wall 38. A portion 78 of the spring 66 bears against the interior surface of housing 38 to generate spring pressure against door 62.

Sufficient structure of the inlet assembly 18 has now been described so that its operation during a fuel filling of the fuel tank can be explained. To prevent leakage between the assembly and the inlet tube 10, the housings 20 and 38 are provided with O ring seals 80, 82 respectively. When fuel is introduced to the fuel tank through nozzle 16, air and fuel vapor are displaced as the liquid level increases. The displaced air and vapor flow from the vent tube 58 and through the annular passage 42. The vapor then flows into the space between the seals 34, 48. This space is divided into two chambers. An inner chamber 84 is located inwardly of a dividing or partition wall portion 86 which extends obliquely in the space between housings 26 and 38. The partition wall 86 has an aperture 88 therethrough which connects the inner chamber 84 with an outer chamber 90. During the fuel fill operation, displaced fuel vapors pass from the vent tube 58 and through the annular passage 42 into chamber 84. The vapors then flow through aperture 88 to outer chamber 90. A vapor conduit member 92 is attached to inlet tube 10 over an opening therein by a brazed joint 94 or other suitable attachment means. The conduit 92 communicates the outer chamber 90 with vapor storage means (not shown). Specifically, the end 96 of conduit 92 is formed with a raised bead to sealingly engage an elastomeric hose (not shown). This hose extends to the inlet of an associated vapor storage apparatus or canister (not shown) which is commonly used to store vapors associated with automobiles. Accordingly, the fuel vapors which are displaced from the fuel tank during filling are prevented from escaping to the atmosphere.

Because the vapor storage capacity of the typical canister is limited, even a small quantity of liquid fuel overwhelms and overfills it. Thus, it is very important to prevent the flow of liquid fuel into the canister. To prevent this liquid flow, a closure valve 98 is provided as shown in FIG. 1. The valve 98 overlies and covers aperture 88 whenever liquid fuel is present. The valve 98 is supported by a bracket or wall portion 100 of housing 36. A small shaft or pin 102 extends through the bracket 100 and also through an arm portion 104 of the valve 98. The curved upper surface 106 of the valve 98 is configured to engage edge portions of wall 86 about the aperture 88 to prevent liquid flow into the chamber 90. A hollow float 108 is attached to the valve 98. The float 108 responds to liquid fuel by pivoting the valve 98 upward against gravity into closed position.

Figure 1A:
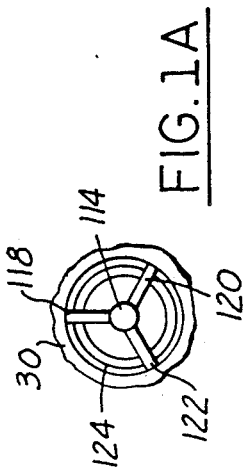

Although it rarely occurs, abnormally high pressures can be generated in a fuel tank and the inlet assembly. These high pressures need to be relieved. For this purpose, a vent opening 110 in provided through wall 30 of housing 20. An enlarged head portion 112 of a vent valve normally overlies the opening 110 to prevent any flow therethrough. Head portion 112 is connected to a stem portion 114 which in turn is connected to a retainer portion 116. The retainer 116 is best shown in FIG. 1A and consists of three radially extending legs 118, 120 and 122. The radially outer edges of the legs are slidably supported in the bore of housing 26. Retainer 116 axially supports the leftward end of a coil spring 124. Spring 124 normally maintains the head 112 of the vent valve in the overlying closed position but allows the head to move away from the wall 30 when dictated by a high pressure condition in the tank.

Figure 4:
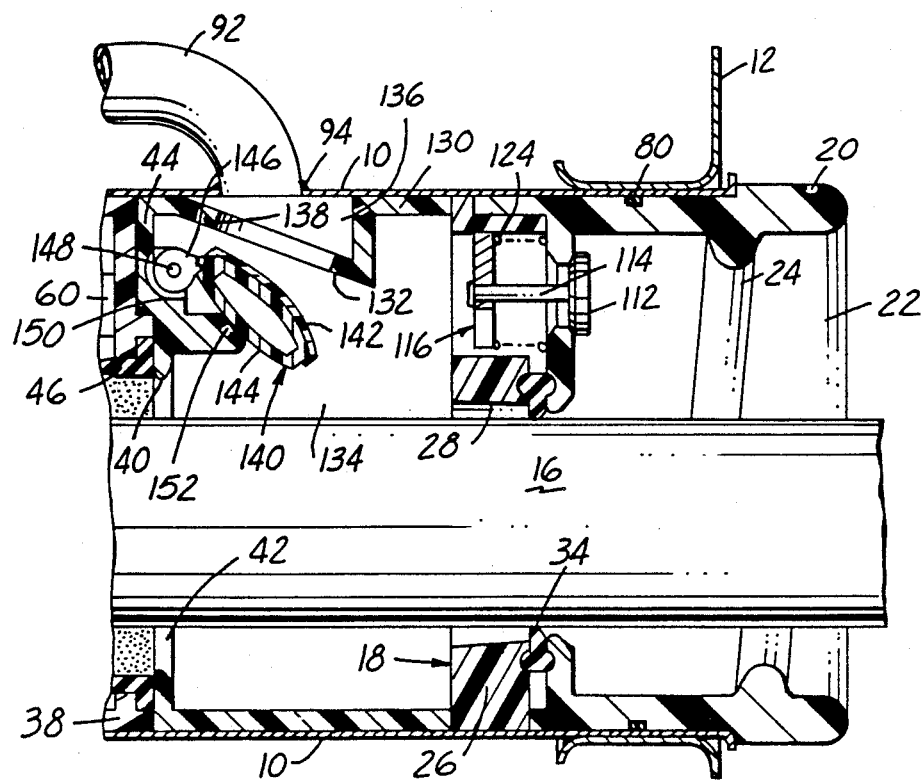

In FIG. 4, a modification of the filler assembly 18 is illustrated. Many of the parts of the modification are the same or very similar to the first embodiment shown in FIGS. 1-3. Therefore, the same or similar parts are labeled with the same numeral indicators as in the first embodiment. However, the counterpart housing 130 in FIG. 4 is different than the housing of FIGS. 1-3. Housing 130 has a partition wall 132 which in angled oppositely to the wall 86 in the first embodiment. An inner chamber 134 is formed inwardly from the wall 132 and an outer chamber 136 is formed outwardly from the wall 132. An aperture or flow port 138 extends through the wall 132 to connect chambers 134 and 136. For the purpose of preventing passage of liquid fuel through the aperture 138, a pivotally supported float type valve 140 is provided. The valve 140 has a curved upper surface 142 adapted to engage edge portions of the wall 132 about the aperture 138 when the valve is moved to the closed position. A hollow float portion 144 is part of the valve 140 so that it is moved upwardly against gravity in response to the effect of liquid fuel on the float 144. Like the valve 98 in FIGS. 1-3, the valve 140 has extended arm means 146 to support it. A pin 148 extends through the end of the arm 146 and is attached to a projecting boss or wall portion 150 of the wall 44. Further, a projecting stop member 152 of the wall portion 44 prevents the valve 140 from pivoting further downwardly than shown in FIG. 4. Further downward movement would likely cause interference with the inward movement of the nozzle 16 at the start of the fill operation.

Although only two embodiments of the invention are shown in the drawings and described in detail heretofore, it is clear that other modifications may be contemplated without falling outside the scope of the invention as claimed hereafter.

We claim:

1. For a vehicle fuel tank having a tubular, open ended inlet structure and defining an interior, an improved fuel filler assembly which is configured to be insertably assembled into the tubular, open ended inlet structure, the fuel filler assembly being so configured to isolate the fuel tank interior from atmosphere before and during a filling operation during which an elongated nozzle of a liquid fuel delivery apparatus is inserted into the fuel filler assembly, comprising: the fuel filler assembly including a plurality of generally tubular housing members within the open ended, tubular inlet structure and arranged in end to end relationship with one another, a first and outer housing member having an axially directed opening therethrough sufficient to allow passage of the elongated nozzle therethrough; a second housing member positioned inwardly from the first housing member in the tubular, open ended inlet structure and having an axially directed opening therethrough corresponding to and adjacent with the opening in the first housing member and sufficient to allow passage of the elongate nozzle therethrough; an annularly shaped seal member between the first and second housing members and having a radially inwardly directed edge adapted to slidingly engage the elongated nozzle as it is inserted into the fuel filler assembly during a fuel delivery operation, the contact by the seal edge with the elongated nozzle providing a good seal to prevent fluid leakage from the interior of the fuel tank to atmosphere; a third housing member positioned inwardly from the second housing member in the tubular, open ended inlet structure and having an axially directed aperture therethrough significantly larger than the elongated nozzle to form an annular fluid flow passage to permit the flow of any fluid therebetween which is displaced from the fuel tank interior as liquid fuel is delivered therein by the elongated nozzle, the aperture in the third housing member being axially spaced from the adjacent openings in the first and second housing members whereby an interior space is formed therebetween; the third housing member having a wall portion extending both radially and axially to separate the interior space into an inner chamber communicated directly to the annular fluid flow passage and an outer chamber within the tubular, open ended inlet structure; means connected to the outer chamber to receive fluid; the wall portion having a vapor flow aperture therethrough interconnecting the inner and outer chambers; valve means normally positioned downwardly and away from the vapor flow aperture to permit vapor flow from the fuel tank interior and inner chamber into the outer chamber and then to the fluid receiving means, the valve means including hinge means between the valve means and the third housing member to pivotally guide movement of the valve means against gravity from the downward and open position to an upward and close position which prohibits flow of fluid through the vapor flow aperture to the receiving means; the valve means being sufficiently lighter than liquid fuel so that liquid fuel engaging the valve means causes it to pivot upwardly to the closed position; a fourth housing member positioned inwardly from the third housing member and having an axially directed aperture corresponding and aligned with the aperture in the third member; an annularly shaped end seal member spaced about and away from the elongated nozzle so as to preserve the annular flow passage about the elongated nozzle; a closure member normally extending in a radial direction when in a closed position in sealing relation to the end seal member thus prohibiting communication between the fuel tank interior and the inner chamber, the closure member being pivotally supported by the fourth housing member to permit its movement away from the end seal member toward a more axially oriented direction by insertion of the elongated nozzle through the apertures of the third and fourth housing members whereby fuel vapor and air from the fuel tank interior may flow to the fluid receiving means but liquid fuel is prevented from passing the pivotal valve means.

2. The improved fuel filler assembly as described in claim 1 in which the first housing member has a radially extending wall portion extending outwardly from its axially directed opening therethrough; the wall portion having a relatively small pressure relief passage formed therethrough; an aligned passage formed in the second housing member, both passages communicating the inner chamber with atmosphere; a pressure relief valve member having an enlarged head portion normally overlying the relief passage in the first member to prevent escape of fluid from the inner chamber to atmosphere; means yieldably urging the enlarged head portion in covering relation with respect to the relief passage but allowing movement to open the relief passage in response to a large differential pressure force acting on the enlarged head portion in opposition to the yieldable means.

* * * * *